US008193488B2

(12) United States Patent
Gapes et al.

(10) Patent No.: US 8,193,488 B2
(45) Date of Patent: Jun. 5, 2012

(54) VIBRATING PROBE

(75) Inventors: Daniel Gapes, Rotorua (NZ); Grant Emms, Rotorua (NZ)

(73) Assignee: New Zealand Forest Research Institute Limited, Rotorua (NZ)

( * ) Notice: Subject to any disclaimer, the term of this patent is extended or adjusted under 35 U.S.C. 154(b) by 163 days.

(21) Appl. No.: 12/827,308

(22) Filed: Jun. 30, 2010

(65) Prior Publication Data

US 2010/0327158 A1 Dec. 30, 2010

(30) Foreign Application Priority Data

Jun. 30, 2009 (NZ) ........................................ 578108

(51) Int. Cl.
*H01J 49/26* (2006.01)
*G01N 24/00* (2006.01)

(52) U.S. Cl. ........ 250/288; 250/281; 250/282; 250/286; 250/284

(58) Field of Classification Search .................. 250/281, 250/282, 284, 286, 288
See application file for complete search history.

(56) References Cited

U.S. PATENT DOCUMENTS

| | | | | |
|---|---|---|---|---|
| 5,448,062 | A * | 9/1995 | Cooks et al. | 250/288 |
| 6,360,588 | B1 * | 3/2002 | Ross et al. | 73/38 |
| 6,692,696 | B1 * | 2/2004 | Alberte | 422/50 |
| 7,448,248 | B2 * | 11/2008 | Carey et al. | 73/1.04 |
| 7,619,216 | B1 * | 11/2009 | Whitehouse et al. | 250/288 |
| 7,658,094 | B2 * | 2/2010 | Brumboiu et al. | 73/64.56 |
| 7,714,274 | B2 * | 5/2010 | Degertekin et al. | 250/281 |
| 7,714,278 | B2 * | 5/2010 | Boyle et al. | 250/287 |
| 7,749,445 | B2 * | 7/2010 | Masters | 422/82.01 |
| 7,902,501 | B2 * | 3/2011 | Landgraf | 250/288 |
| 7,928,364 | B2 * | 4/2011 | Musselman | 250/285 |
| 2007/0181799 | A1 * | 8/2007 | Krogh et al. | 250/288 |
| 2009/0020696 | A1 * | 1/2009 | Bier | 250/288 |
| 2010/0327158 | A1 * | 12/2010 | Gapes et al. | 250/282 |

* cited by examiner

*Primary Examiner* — David A Vanore
(74) *Attorney, Agent, or Firm* — Dann, Dorfman, Herrell and Skillman, P.C.

(57) ABSTRACT

A measuring system comprising: a MIMS probe 1 comprising a membrane inlet 3, a mass spectrometer 2 coupled to the probe, and a vibrator controllable 7 to vibrate the probe 1 to disturb a boundary layer 13 at the membrane inlet 3 when the probe 1 is in a liquid under analysis.

18 Claims, 6 Drawing Sheets

VIBRATING PROBE

FIELD OF THE INVENTION

The present invention relates to improving the response of measuring systems (comprising analytical instruments with membrane inlet probes) using probe vibration. The invention can be used in membrane inlet mass spectrometer (MIMS) measuring systems, although this is not the only system it can be used with.

BACKGROUND TO THE INVENTION

In many physicochemical systems, both natural and artificial, parameters of interest are measured using a membrane to isolate the process from the measuring system (comprising a probe and analytical instrument). A membrane may also be used to select for the analyte of interest. The analyte must therefore pass through the membrane in a manner which permits quantitative evaluation. The measuring system may take many forms, including mass spectrometry, where the system is referred to as "Membrane Inlet Mass Spectrometry" or MIMS. A MIMS measuring system comprises a membrane inlet probe coupled to a mass spectrometer.

Mass spectrometry is often associated with measurements in the gas phase. It is often necessary to carry out measurements in the liquid phase, as, for example, studying the progress of reactions in biological reactors. Many substances of interest are sparingly volatile, and in any case need to be measured in situ in the liquid phase. Here, membrane technologies allow selective permeation of analytes to the high vacuum system of the mass spectrometer.

The response of a MIMS probe (and therefore the measuring system) for various substances is dependant on many physical factors influencing volatility and diffusivity of the target analyte through the membrane. The presence of external mass transport limitations, set up by hydrodynamic surface (boundary) layers (and potentially including biological films) surrounding the membrane significantly influences the response of the MIMS system. For example, analyte depletion of the region proximate the MIMS probe occurs as analytes diffuse through the membrane inlet of the MIMS probe. This results in reduced response/less accurate readings due to the concentration of analytes in the region proximate the probe not being representative of the concentrations in the bulk of the medium under investigation.

SUMMARY OF INVENTION

It is an object of the present invention to improve the response of a MIMS probe measuring system and/or MIMS probe using vibration.

In one aspect the present invention may be said to consist in a measuring system comprising: a MIMS probe comprising a membrane inlet, a mass spectrometer coupled to the probe, and a vibrator controllable to vibrate the probe to disturb a boundary layer at the membrane inlet when the probe is in a liquid under analysis.

Preferably the measuring system is configured for real-time or substantially real-time monitoring of analytes.

Preferably disturbing the boundary layer replenishes analytes into the region proximate the membrane inlet from the liquid under analysis.

Preferably the system further comprises a controller separate to or forming part of the vibrator for controlling the vibrator, the controller being configured or configurable to vibrate the probe at a frequency such that there is no vibration node at the membrane inlet.

Preferably the controller is configured or configurable to vibrate the probe at its resonant frequency.

Preferably the probe is secured along its length to provide a resonance node away from the membrane inlet.

Preferably the controller comprises an adjustable signal generator for configuring the controller to vibrate the probe at the frequency.

Preferably the vibrator is an electromechanical vibrator.

Preferably the vibrator is controllable to vibrate the probe laterally with respect to a surface of the membrane inlet.

In another aspect the present invention may be said to consist in a MIMS probe for a measuring system comprising: a support, a membrane inlet on the support adapted to couple to a mass spectrometer, a vibrator coupled to the support and/or membrane inlet, the vibrator controllable to vibrate the support and/or membrane inlet to disturb a boundary layer at the membrane inlet when the probe is in a liquid under analysis.

Preferably the probe further comprises a controller separate to or forming part of the vibrator for controlling the vibrator, the controller being configured or configurable to vibrate the support and/or membrane inlet at a frequency such that there is no vibration node at the membrane inlet.

Preferably the controller is configured or configurable to vibrate the support and/or membrane inlet at its resonant frequency.

Preferably, in use, the support is secured along its length to provide a resonance node away from the membrane inlet.

Preferably disturbing the boundary layer replenishes analytes into the region proximate the membrane inlet from the liquid under analysis.

Preferably the controller comprises an adjustable signal generator for configuring the controller to vibrate the support and/or mass transfer inlet at the frequency.

Preferably the vibrator is an electromechanical vibrator.

Preferably the vibrator is controllable to vibrate the support and/or membrane inlet laterally with respect to a surface of the mass transfer inlet.

In another aspect the present invention may be said to consist in a method of analysing a liquid comprising: inserting a MIMS probe with a membrane inlet into a liquid for analysis, coupling the probe to a mass spectrometer, vibrating the probe to disturb a boundary layer at the membrane inlet when the probe is in the liquid under analysis.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting

BRIEF DESCRIPTION OF THE DRAWINGS

Preferred embodiments of the invention will be described with reference to the following drawings, of which.

DETAILED DESCRIPTION

1. Overview

Figure 1A:
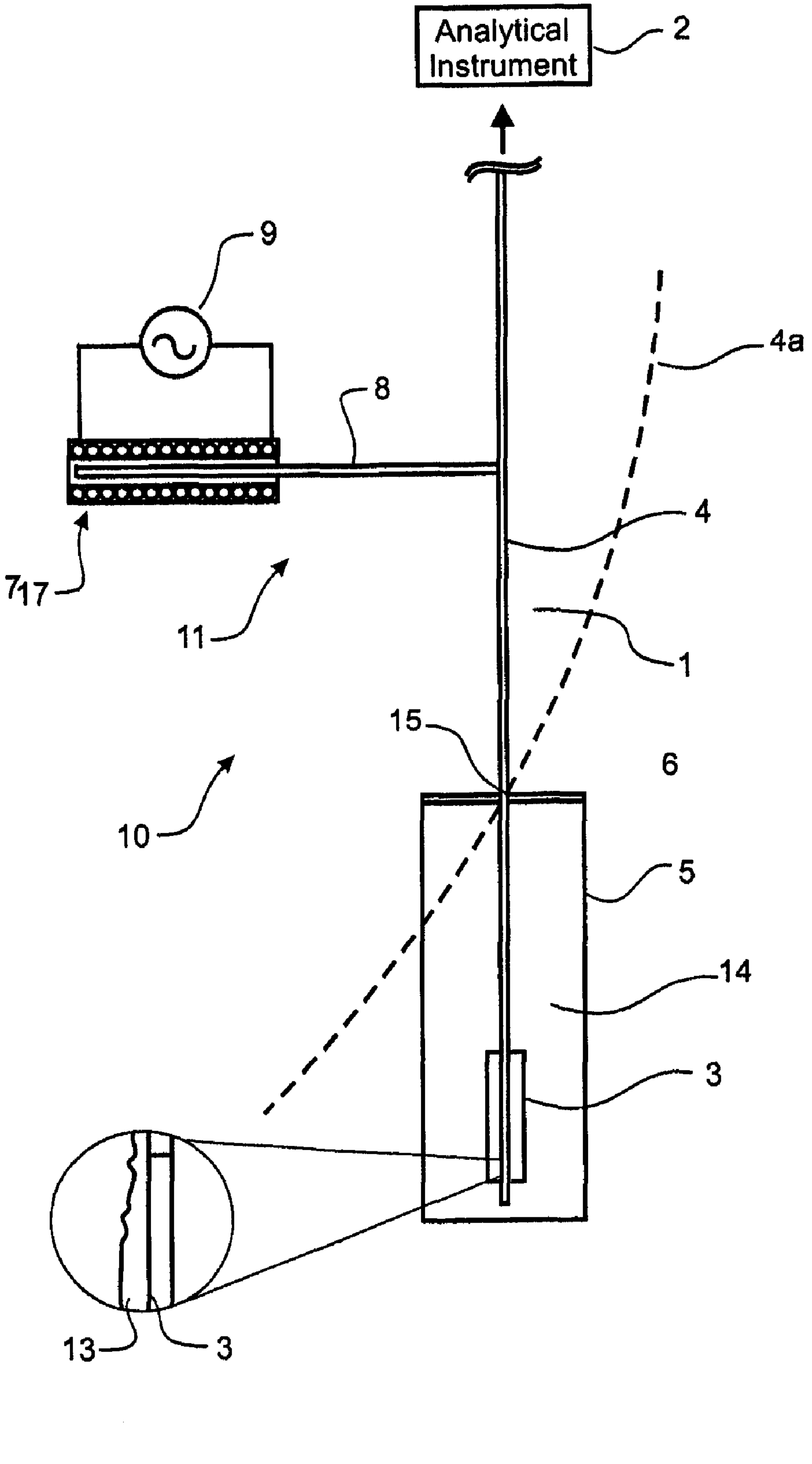
FIG. 1*a* shows a measuring system with a membrane inlet probe and vibration means for the probe.

FIG. 1*a* shows an embodiment of the present invention, which is an improved measuring (monitoring) system. Broadly, the measuring system comprises a probe coupled to an analytical instrument.

Such a measurement system/probe is typically used for real-time (or substantially real-time) measurement/monitoring of changes in sample composition over time (such as analytes in a liquid). This is to obtain readings of levels/concentration and composition of analytes in the liquid and changes in concentration over time so that reactions/treatments can be monitored. For example, the measurement system monitors changes in levels/concentration of analytes when there is a chemical change/reaction occurring—e.g. oxidation in a sewerage pond. Preferably the measurement is made in a non-flowing sample (such as a test-tube or pond, for example).

The invention is suitable for any measuring system with a probe that allows diffusion or other mass transfer to or into it, resulting in depletion at the probe (at the boundary or surface layers in the region around/proximate the probe) of analytes under investigation. Such probes could comprise membrane inlet or other mass transfer inlet probes, which allow for diffusion of analytes through the membrane of the probe. Such probes comprise MIMS probes, polarographic dissolved oxygen probes or ion selective glass probes, for example. If the concentrations in the sample change (e.g. oxygen levels fall and $CO_2$ rises in an oxidation pond), the depleted layer does not reflect this and the readings become less accurate over time. This depletion causes a mass transfer boundary layer effect. The depletion of analytes around the boundary layer around the mass transfer inlet results in reduced accuracy of monitoring. This is because the analyte composition in the depleted region is not representative of the analyte composition in the liquid overall.

The system 10 has a vibration means to disturb boundary surface layers around the membrane inlet to reduce the mass transfer boundary layer effect and improve the response of the system. The term "disturb" broadly means anything that disperses, removes, breaks up or otherwise alters the surface layers that reduce the response of the measuring system. This removes barriers to obtaining accurate measurements. More particularly, the depleted fluid (boundary layer) proximate to the mass transfer inlet is disturbed to replenish analytes into the region proximate the mass transfer inlet from the fluid under investigation—making the analyte composition in the boundary layer more representative of the liquid overall. The vibration caused by the invention breaks up the depleted zone to give better results.

Removal or dispersion of these layers by bulk agitation of the entire medium is not successful or possible in many situations. This is because either the probe is used in a very large volume of liquid, where agitation by a stirrer or similar of the entire or substantial quantity of the medium is not effective, or because the probe is use in a small volume where use of a stirrer is not physically possible due to the relative sizes. The present invention overcomes these problems.

The embodiment described with reference to FIG. 1*a* is used to obtain experimental data to demonstrate the utility of the invention. This embodiment can be used (or be adapted for use) in investigating actual physical, chemical and biological systems.

2. Description of the System

The measuring system 10 comprises a membrane inlet probe 1 that is connected to a suitable analytical instrument 2, such as a mass spectrometer. The probe can be any of those known in the art. For example, the probe 1 comprises a support such as a capillary tube 4 and a membrane inlet (mass transfer inlet) 3 or similar at one end. The membrane inlet 3 allows transfer of the analyte under investigation through the membrane 3 to the analytical instrument 2 via the capillary 4. This type of probe is a membrane inlet probe for a mass spectrometer—that is a MIMS probe.

A vibrating device 11 is coupled to the probe 1 and is controllable to provide vibration of the membrane 3 via the capillary 4. It could be horizontal/lateral vibration (with respect to the membrane inlet surface) or vertical vibration or a combination of both. The vibration device can take any suitable form of electromechanical vibration device. The vibration device is controllable by way of a controller, which is configured or configurable to operate the vibration device to provide the required vibration of the probe. The controller can form part of, or be separate to, the vibrator. For example, in one embodiment, the vibration device 11 comprises an electromechanical transducer 7 that oscillates an actuator 8 that is coupled to the capillary 4. The transducer 7 is operated by way of a variable frequency signal generator 9. In one embodiment, the signal generator could generate oscillations from an AC mains voltage. An oscillating signal from the signal generator 9 is applied to the transducer 7, which sets up an oscillating magnetic field in the transducer 7, which in turn oscillates the actuator 8 horizontally. This physically vibrates the capillary 4 (see e.g. dotted line 4*a*), which in turn vibrates the membrane 3. In one possible embodiment, the transducer 7 comprises a loud speaker arrangement. The signal generator 9 can form the controller and be part of or separate to the vibrating device. The controller might further comprise a microcontroller or similar to operate the signal generator 9 and/or vibrating device. Other vibration devices could be envisaged by those skilled in the art, to provide the required horizontal/vertical vibration or combination thereof.

The probe 1 can be placed in the medium (e.g. liquid) under investigation. In FIG. 1, for experimental purposes, the probe 1 is placed in a sample vessel 5 that contains a liquid 14 with the analyte under investigation. Optionally, a closure 6 is placed over the vessel 5 to seal the vessel from the external atmosphere to exclude mixing. For example, the closure can comprise one layer of PARAFILM®. The closure layer might form a resonant node 15 where it contacts the capillary 4 of the probe 1. The probe can alternatively be used in the entire medium under investigation, rather than a sample of it.

The signal generator 9 output preferably can be adjusted for amplitude and frequency to obtain the desired amplitude and frequency of vibration 4*a* in the capillary 4 to maximise disturbance of any surface layers 13 occurring at the surface of the membrane 3. Preferably, the signal generator output is adjusted to vibrate 4*a* the capillary 4 at its resonant frequency, thus setting up a resonance in the probe 1. This can optimise disturbance of the surface layers 13, and as a result improve the response of the measuring system 10.

The nature of the vibration of the probe (such frequency/amplitude of vibration), and in particular any resonant vibration, is dependent on a number of inherent characteristics of the probe, such as density, length, thickness and material for example. The nature of any resonance will also be influenced by the existence of a node 15 at the closure 6. Using knowledge of the inherent characteristics of the probe and/or any node(s), the control signal can be selected to set up the desired vibration to maximise disturbance of boundary layers 13. The position of the node at the closure can be controlled where necessary, and even probe could be selected for desired characteristics where possible to achieve the desired vibration (and where appropriate resonant vibration).

Preferably, the vibrating device is controlled to vibrate the probe such that there is no vibration node at the membrane inlet 4. This ensures that the membrane inlet is vibrating and can disturb the boundary layer. One way to achieve this is by controlling the vibrating device to vibrate the probe at its resonant frequency and to secure the capillary (support) along its length to provide a resonance node away from the membrane inlet 4.

From experiments, it has been shown that vibration of the membrane 3 helps disturb the surface layer 13, which allows analytes (that are depleted from that region during testing) to pass into the depletion region 13, through the membrane and to the analytical instrument via the capillary 4. This replenishment of the depletion region/boundary layer with analytes improves the response of the probe and ultimately the measurements of the analytical instrument.

Figure 1B:
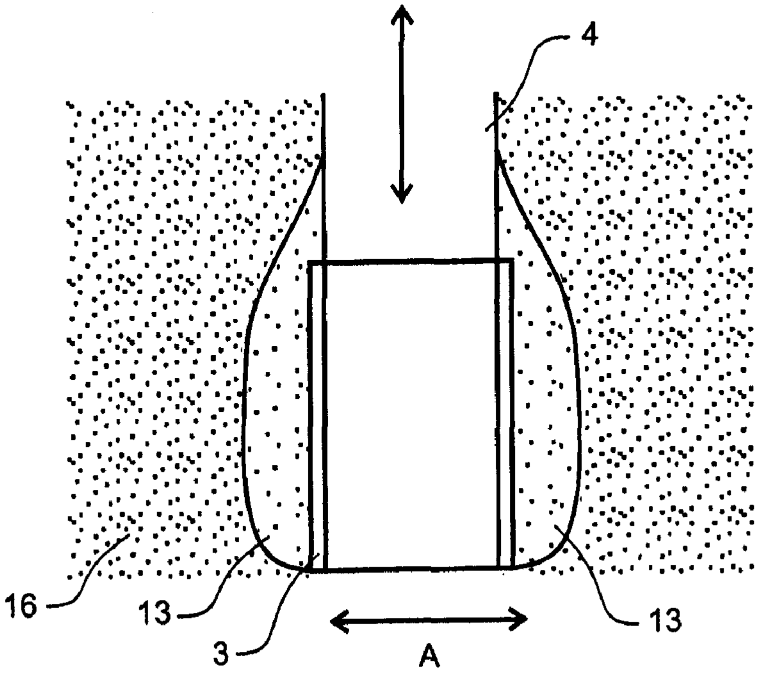
FIG. 1*b* shows the membrane inlet and boundary layer in more detail.
Figure 1C:
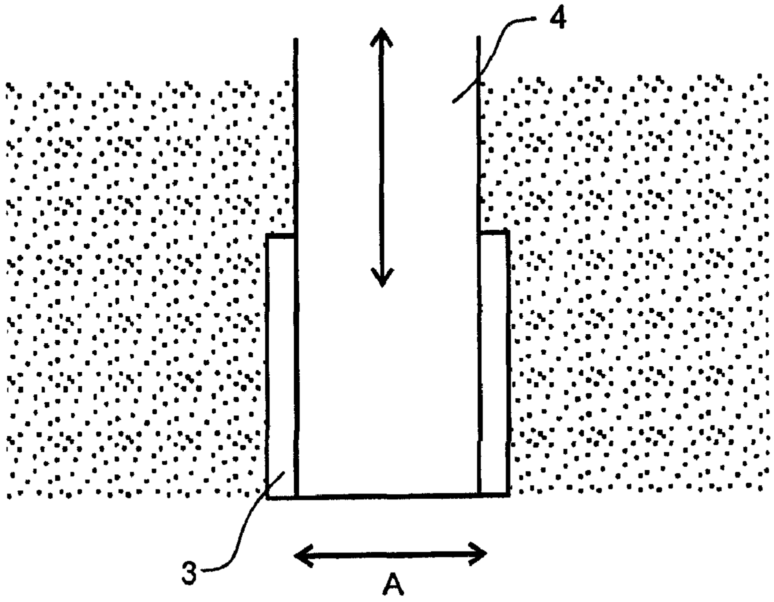
FIG. 1*c* shows redistribution of analytes into the boundary layer after vibration of the probe.

FIGS. 1*b* and 1*c* show in further detail disturbance of the boundary layer/depletion region 13. The liquid comprises analytes 16. As shown in FIG. 16, in the boundary layer 13, the concentration of analytes is much less than the bulk of the fluid 16. This is because analytes have been depleted from the boundary layer 13 due to diffusion of the analytes through the membrane. The membrane is then vibrated with respect to the membrane surface as shown by the arrows. This breaks up the boundary layer 3 so that analytes are redistributed from the bulk of the liquid into the region 13 to replenish the analytes there, as shown in FIG. 1*c*.

While it is not essential for the vibration of the capillary 4 to reach resonance, it has be found that if resonance is achieved the efficacy of the arrangement is significantly increased—that is, the disturbance of the boundary layer is significantly increased thus improving the response of the system.

Further, measuring systems like those relevant to the present invention require calibration. In the case of a MIMS probe, for example, the system calibration includes the probe. This requires removal of the probe from the measuring system to the calibration system. The calibration environment should be the same as the measuring environment. In actual use, such as in a biological reactor, it is not possible to provide a calibration environment similar to that of the reactor due to the complex nature of the reacting system. Vibration of the probe according to the present invention allows the immediate environment of the probe in the reactor to be transferred to a simple calibration environment.

The measuring system according to the invention could utilise any suitable analytical instrument and probe. The measuring system according to the embodiment above comprises a membrane inlet (such as a MIMS system), although the invention is not restricted to such systems. It will be appreciated that other types of measuring systems could benefit from probe vibration to disturb boundary layers.

The system can also assist in removing growth or build-up on the probe.

It will also be appreciated that while the description above relates to a measuring system, the invention itself could be considered to be the probe and vibration means alone. In this case they would be adapted for coupling to an analytical instrument to form a measuring system. Alternatively, the invention might be the vibration means adapted for coupling to a probe, or probe/analytical instrument combination.

3. Uses of the System

The measuring system, such as that describe in relation to FIG. 1, can be used in any suitable application where testing of analytes in a liquid medium is required. It can be adapted as required for the application.

For example, the system might be used for testing in a fermenter. Here, the probe will be inserted through a cover of the fermenter, to test the analytes therein. The probe might be attached to the cover, creating a node as describe above. This would be taken into account in arranging vibration of the probe.

Typically in such measuring, a boundary layer exists which reduces the efficacy of analysis. In many normal applications it may not be not practicable to mix using traditional methods to suitably break up the barrier layer. This is because either the liquid medium volume is too large for mixing to be effective, or the sample volume is too small to allow mixing apparatus to be used. The device can be adjusted to allow for self tuning to meet the resonant frequency of the probe.

4. Experimental Data Obtained from the System in FIG. 1

The system of FIG. 1 was used to demonstrate that applying an audio frequency vibration to a MIMS probe successfully allows quantitation of selected analytes under stagnant fluid conditions where quantitation would otherwise be compromised.

4.1 Methodology

An initial trial of a simple system with one liquid medium, water, was used to determine the dissolved gaseous components of air. Due to the relatively low solubility of oxygen and nitrogen in water, transport of these gases through a membrane is significantly influenced by the formation of depleted boundary layers. Another trial was made using ethanol in solution as a representative small molecular weight polar organic.

Three conditions were used to evaluate the response of the M/S system to probe vibration/no vibration.

1. Water phase with agitation by stirrer (control).
2. Water phase without agitation, with and without vibrations.
3. Headspace (atmospheric) gases.

To carry out the trials a 40 mm diameter cylindrical vessel 5 of about 100 ml total volume provided with a magnetically coupled stirrer was used. The magnetic stirrer was used for as a control. A 15 mm×6 mm stirrer bar was used. About 60 ml of deionised water provided the liquid medium. The stirrer and vessel 5 were mounted on a “Lab Jack” stand so the height could be varied, enabling the probe 1 membrane 3 to be positioned either in the liquid or the headspace phase, the probe 1 position remaining fixed. Other operating conditions were:

1. Sample temperature: 25° C. (ambient in air conditioned room).
2. Probe jacket temperature 60°.
3. Mass spectrometer using Faraday detector and single ion monitoring for target gases.

To introduce the probe 1 to the sample vessel 5, it was thought to provide a seal 6, to allow the probe 1 to flex but also exclude mixing from the external atmosphere. A closure of one layer of PARAFILM® was used.

The length of bare MIMS probe available for the experiment was restricted by the heater surrounding the upper part of it to about 120 mm. This was a constraint where the heater and the clamp holding the probe in position provided severe dampening, effectively being a pivot point for the flexing.

Flexing vibrations were obtained by coupling the probe to the centre of a 100 mm nominal diameter loudspeaker 7. The speaker was energised by a sine wave generated by an audio frequency function generator. A length of 3 mm steel wire was attached to the voice cone, and to the probe, by use of BLU-TACK®. The point of attachment to the probe was initially about 2 cm from the end of the heater jacket, and the PARAFILM® closure was positioned about 5 cm from the heater when the probe was immersed in the liquid.

Once a suitable experimental setup had been obtained a series of trials were made using the oxygen signal to evaluate the efficacy of the setup. Oxygen was chosen as with a membrane inlet the mass spectrometer signal is very susceptible to boundary layer conditions. Variables investigated for effect were:

1. Vibration frequency.
2. Vibration amplitude (output setting), measured by the voltage across the voice coil.
3. Stirrer speed The mass spectrometer response was measured by:

1. Detector output amplitude.
2. Time to steady state.

Figure 3:
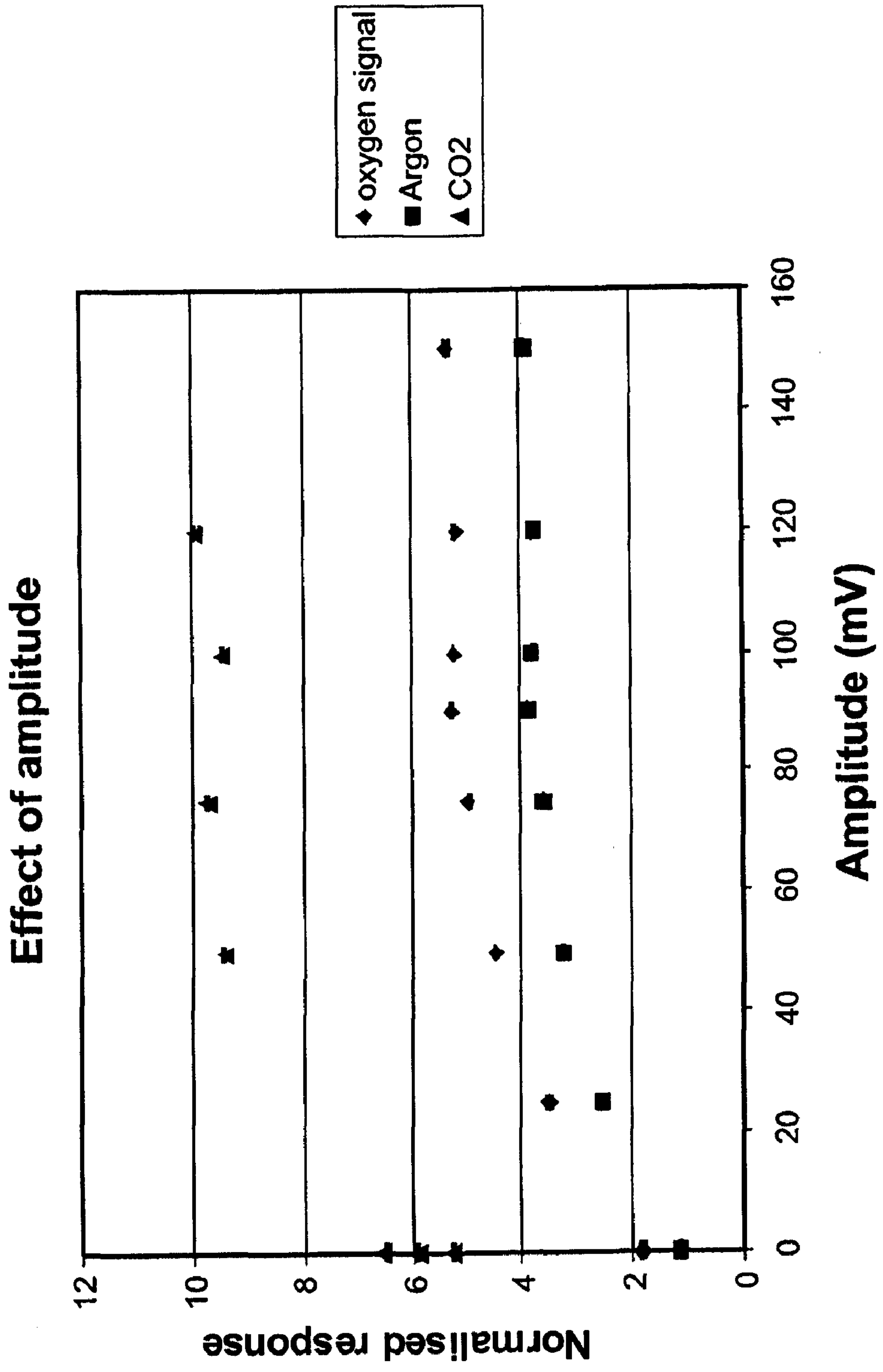
FIGS. 3 and 4 show the various responses of the probe when for different vibration amplitudes and frequencies.

It was found that the three "permanent gases" quantified, oxygen, nitrogen, and argon, had an identical response to changes in variables, and the oxygen signal was used for convenience. Comparison of FIG. 5 and FIG. 6 demonstrates this. Carbon dioxide due to its solubility and sensitivity to ambient conditions (e.g. any pH change) was more problematic. FIG. 3 illustrates that it tended to follow the other gases.

This experimental setup had to be modified when results suggested the PARAFILM® closure was not satisfactory.

The effect of stirrer speed was observed at four different nominal rates. The actual rotational rate was not determined and the numbers given were derived from the control markings. The nominal speed '100' corresponded approximately to the fixed speed used for comparison with the effect of vibration amplitude and frequency. At all times care was taken that any vortex formed was small and did not approach the inlet membrane of the probe.

4.2 Results

Initial experimental conditions were based on previous work. The generator was set to provide an output of about 30 mV across the 8 ohm nominal loudspeaker voice coil, at a frequency of about 53 Hz. It was found that even at this relatively low output the PARAFILM® coupled the probe vibrations to the vessel, negating the desired condition of vibrating the probe only. This was reduced by fastening the vessel to the magnetic stirrer base with BLU-TACK®. Other points of attachment for the vibrator on the MIMS probe were tried.

Figure 2:
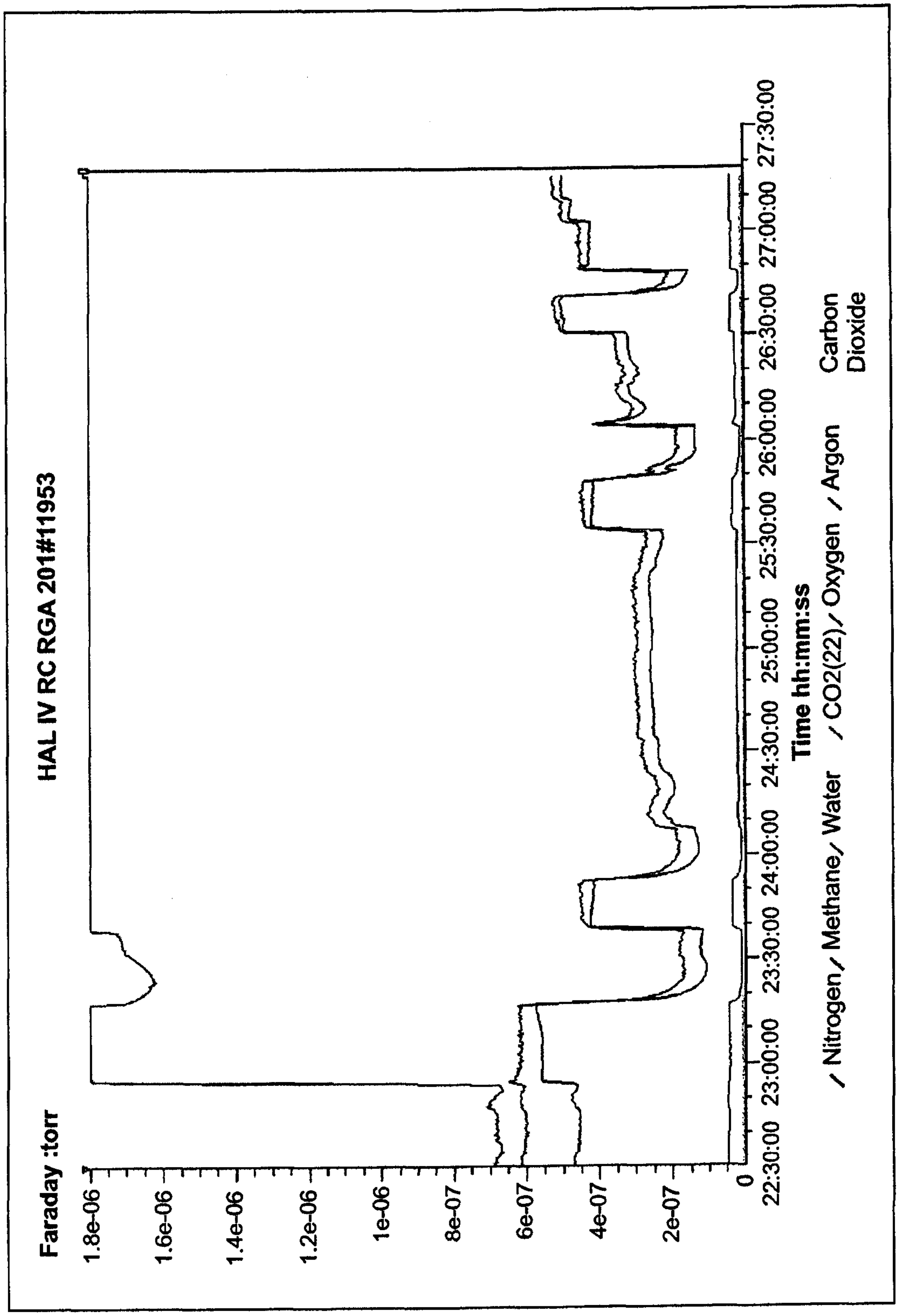
FIG. 2 shows the response of the probe.

FIG. 2 illustrates the observations made while the closure was intact.

The following results were obtained in the water phase once the closure was cut, eliminating any bias from vibratory effects on the reaction vessel.

Effect of Amplitude

Table 1 summarises the effect of varying the electrical signal measured across the speaker voice coil on the detector response for oxygen once the closure was cut. The actual amplitude of the probe vibration was not measured

TABLE 1

Effect of electrical amplitude (53 Hz)

| Amplitude (mV) | oxygen signal |
|---|---|
| 50 | $4.49e^{-7}$ |
| 75 | $4.97e^{-7}$ |
| 100 | $5.16e^{-7}$ |
| 120 | $4.98e^{-7}$ |
| 25 | $3.46e^{-7}$ |
| 90 | $5.27e^{-7}$ |
| 150 | $5.33e^{-7}$ |
| stirrer (control) | $4.46e^{-7}$ |

FIG. 3 is a plot of detector response (normalised to remove exponents, and averaged over time) and the voltage at constant frequency (53 Hz).

Effect of Frequency

Figure 4:
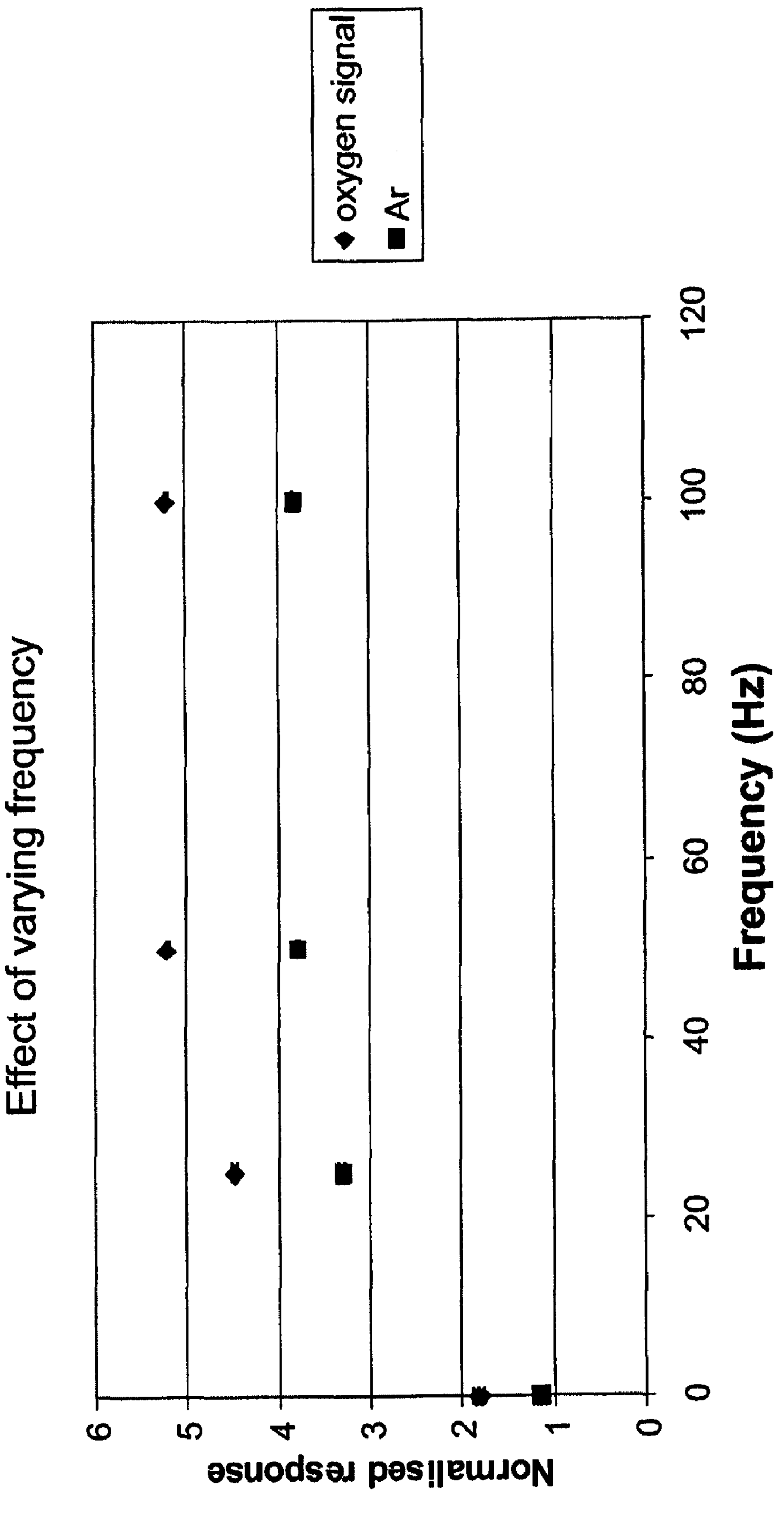

Table 2 summarises the effect of varying the frequency. The electrical amplitude was set at about 100 mV. FIG. 4 is a plot of detector response averaged over time.

TABLE 2

Effect of frequency (output 100 mV)

| Frequency (Hz) | oxygen signal |
|---|---|
| 25 | $4.47e^{-7}$ |
| 50 | $5.27e^{-7}$ |
| 100 | $5.18e^{-7}$ |
| stirrer (control) | $4.56e^{-7}$ |

Effect of Stirring and Vibration on Response Time

Inspection of FIG. 3 shows that there was no quantifiable difference between stirring and all vibration conditions. Response was fast and may have been controlled by the detector.

Effect of Stirring at Varying Rates

Figure 5:
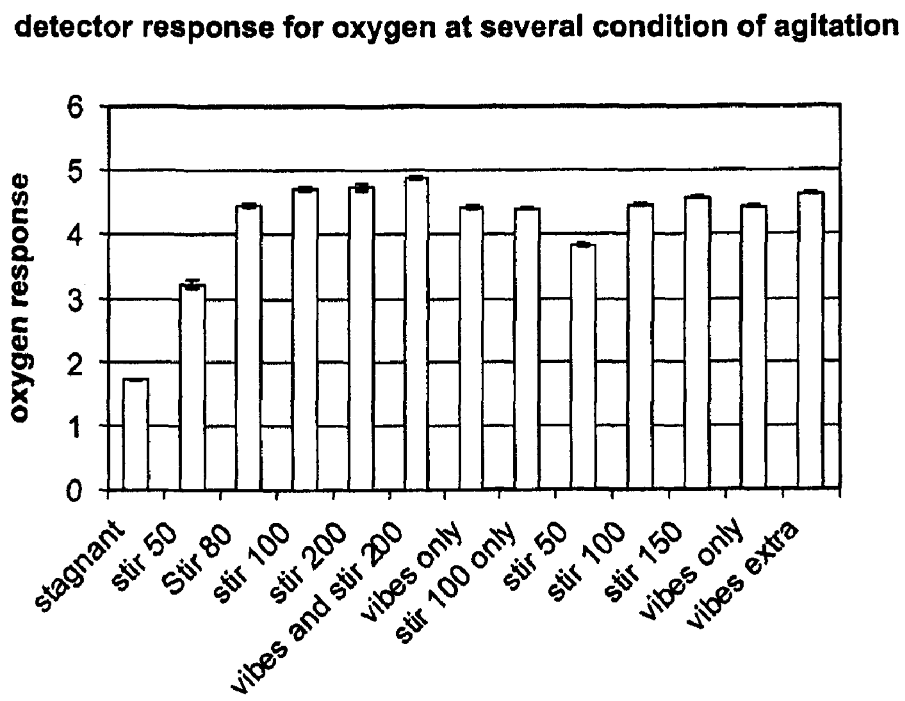
FIGS. 5 and 6 show the response for oxygen and argon respectively for various disturbance methods.
Figure 6:
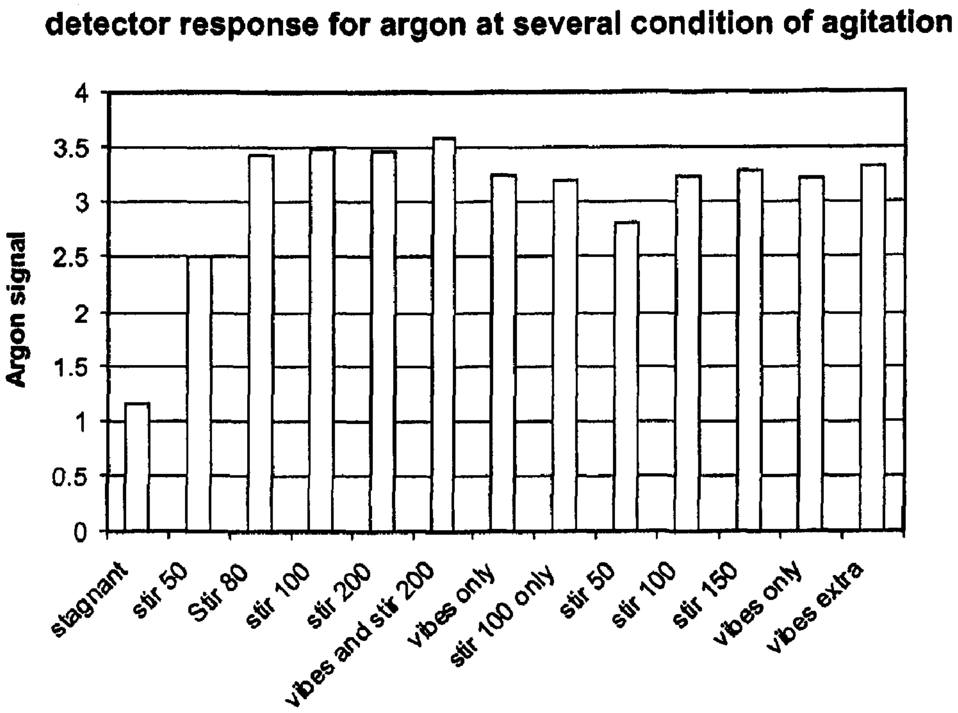

Table 3 compares the effect of stirring at different nominal rates, and the effect of the probe vibrator. FIG. 5 compares these conditions averaged over time. Error bars are shown in FIG. 5 but were omitted from the other figures due to the negligible size. FIG. 6 shows the results for argon. The carbon dioxide signal was available but results are variable and affected by ambient conditions which were not closely controlled.

TABLE 3

Effect of stirring speed.

| Stirring conditions | oxygen signal |
|---|---|
| Stagnant, no stirring | $1.78e^{-7}$ |
| '50' | $3.36e^{-7}$ |
| '80' | $4.52e^{-7}$ |
| '100' | $4.68e^{-7}$ |
| '150' | $4.6e^{-7}$ |
| '200' | $4.73e^{-7}$ |
| Add vibrator @ 100 mV | $4.75e^{-7}$ |
| No stirring or vibrator | $1.91e^{-7}$ |
| Vibrator only | $4.39e^{-7}$ |
| Stirrer only '50' | $3.86e^{-7}$ |
| '100' | $4.43e^{-7}$ |
| '200' | $4.6e^{-7}$ |
| No stirrer, vibrator on | $4.42e^{-7}$ |
| vibrator @ 190 mV | $4.45e^{-7}$ |

4.3 Conclusions

The results show that vibration of the probe was at least as effective in removing boundary layers 13 as vigorous agitation. In the experimental apparatus there was no improvement gained (for this particular experimental set up) by increasing vibration beyond a frequency of about 50 Hz and an electrical amplitude of about 100 mV. A stirring rotation rate of about '100' nominal was about optimum. Clearly, other frequencies and amplitudes higher than this might be suitable for other set-ups.

The invention claimed is:

1. A measuring system comprising:

a MIMS probe comprising a membrane inlet, a mass spectrometer coupled to the probe, and a vibrator controllable to vibrate the probe to disturb a boundary layer at the membrane inlet when the probe is in a liquid under analysis.

2. A measuring apparatus according to claim 1 wherein the measuring system is configured for real-time or substantially real-time monitoring of analytes.

3. A measuring apparatus according to claim 1 wherein disturbing the boundary layer replenishes analytes into the region proximate the membrane inlet from the liquid under analysis.

4. A measuring system according to claim 1 further comprising a controller separate to or forming part of the vibrator for controlling the vibrator, the controller being configured or configurable to vibrate the probe at a frequency such that there is no vibration node at the membrane inlet.

5. A measuring system according to claim 4 wherein the controller is configured or configurable to vibrate the probe at its resonant frequency.

6. A measuring system according to claim 5 wherein the probe is secured along its length to provide a resonance node away from the membrane inlet.

7. A measuring apparatus according claim 4 wherein the controller comprises an adjustable signal generator for configuring the controller to vibrate the probe at the frequency.

8. A measuring apparatus according to claim 1 wherein the vibrator is an electromechanical vibrator.

9. A measuring apparatus according to claim 1 wherein the vibrator is controllable to vibrate the probe laterally with respect to a surface of the membrane inlet.

10. A MIMS probe for a measuring system comprising:

a support, a membrane inlet on the support adapted to couple to a mass spectrometer, a vibrator coupled to the support and/or membrane inlet, the vibrator controllable to vibrate the support and/or membrane inlet to disturb a boundary layer at the membrane inlet when the probe is in a liquid under analysis.

11. A probe according to claim 10 further comprising a controller separate to or forming part of the vibrator for controlling the vibrator, the controller being configured or configurable to vibrate the support and/or membrane inlet at a frequency such that there is no vibration node at the membrane inlet.

12. A probe according to claim 11 wherein the controller is configured or configurable to vibrate the support and/or membrane inlet at its resonant frequency.

13. A probe according to claim 12 wherein, in use, the support is secured along its length to provide a resonance node away from the membrane inlet.

14. A probe according to claim 10 wherein disturbing the boundary layer replenishes analytes into the region proximate the membrane inlet from the liquid under analysis.

15. A probe according to claim 10 wherein the controller comprises an adjustable signal generator for configuring the controller to vibrate the support and/or mass transfer inlet at the frequency.

16. A probe according to claim 10 wherein the vibrator is an electromechanical vibrator.

17. A probe according to claim 10 wherein the vibrator is controllable to vibrate the support and/or membrane inlet laterally with respect to a surface of the mass transfer inlet.

18. A method of analysing a liquid comprising:

inserting a MIMS probe with a membrane inlet into a liquid for analysis, coupling the probe to a mass spectrometer, vibrating the probe to disturb a boundary layer at the membrane inlet when the probe is in the liquid under analysis.

* * * * *